United States Patent
Aasman et al.

(10) Patent No.: US 7,328,005 B2
(45) Date of Patent: Feb. 5, 2008

(54) INFORMATION STORAGE SYSTEM

(75) Inventors: Jannes Aasman, Leiden (NL); Johannes Jan Kardol, Delft (NL); Robertus Johannes Nicolaas Kalberg, Zoetermeer (NL)

(73) Assignee: Koninklijke KPN N.V., The Hague (NL)

( * ) Notice: Subject to any disclaimer, the term of this patent is extended or adjusted under 35 U.S.C. 154(b) by 132 days.

(21) Appl. No.: 10/288,226

(22) Filed: Nov. 5, 2002

(65) Prior Publication Data

US 2003/0092430 A1    May 15, 2003

(30) Foreign Application Priority Data

Nov. 5, 2001  (NL) .................................... 1019286

(51) Int. Cl.
    H04L 29/08    (2006.01)
(52) U.S. Cl. .................. 455/414.4; 370/335; 707/202; 709/203
(58) Field of Classification Search .................. 707/10, 707/104.1, 202, 201; 455/412.1, 414.1; 379/88.17, 379/242, 265.09; 370/335; 709/203
    See application file for complete search history.

(56) References Cited

U.S. PATENT DOCUMENTS

| | | | |
|---|---|---|---|
| 5,708,780 A * | 1/1998 | Levergood et al. ......... 709/229 |
| 5,708,828 A | 1/1998 | Coleman |
| 6,052,695 A * | 4/2000 | Abe et al. .................... 707/202 |
| 6,339,773 B1 * | 1/2002 | Rishe ............................ 707/4 |
| 6,418,196 B1 * | 7/2002 | Brlenic et al. ........... 379/32.04 |
| 6,690,788 B1 * | 2/2004 | Bauer et al. ................ 379/242 |
| 6,714,979 B1 * | 3/2004 | Brandt et al. ............... 709/225 |
| 6,853,995 B2 * | 2/2005 | Matsuzaki et al. ........... 707/10 |
| 6,901,428 B1 * | 5/2005 | Frazier et al. .............. 709/203 |

FOREIGN PATENT DOCUMENTS

| EP | 0 821 507 A2 | 1/1998 |
|---|---|---|
| EP | 1 030 254 A1 | 8/2000 |
| WO | WO 01/50702 A2 | 7/2001 |

* cited by examiner

Primary Examiner—Gerald Gauthier
(74) Attorney, Agent, or Firm—Michaelson & Associates; Peter L. Michaelson

(57) ABSTRACT

Method and customer information system with a processor and memory, from which information is retrievable, whereby such system:
- can communicate with several remote data sources;
- can import from those several data sources several data streams, which may have a different data format in each instance;
- can convert the several data streams to unified data streams with a unified data format;
- can store the unified data streams in the memory;
- can import updated data at predetermined times from the associated external data source.

21 Claims, 1 Drawing Sheet

INFORMATION STORAGE SYSTEM

FIELD OF THE INVENTION

The invention pertains to an information storage system for providing information to customers, comprising at least one user interface plus memory devices for storing information, via which user interface data can be read out from the memory devices.

PRIOR ART

Dutch patent application 1015165 filed by Koninklijke KPN N. V., that on the day of priority of the present patent application had not yet been published, describes an information storage system. That system comprises user terminals (such as mobile telephones) that users can operate. There is also a separate terminal, intended for a human personal assistant, which is connected to a personal assistant server. Users can call the personal assistant to obtain information or services. In that system, the personal assistant server is connected to user databases that contain information about the various users. The personal assistant server reads out data about the users concerned when they call the personal assistant. The personal data are sent to the terminal of the personal assistant so that the personal assistant knows who he is dealing with and can immediately personally handle instructions/requests from the user. The system can concern an e-mail system, a diary system, internal or external information systems, an SMS system, a fax system, a unified messaging system and so on. However, in this system, the time that it takes before the personal assistant has obtained essential data from various data banks and can subsequently pass them on to the user may pose a problem in some cases.

EP-A-1.030.254 discloses a system provided with memory to store data received from different data sources. The data as received from the different data sources may have different data formats. Thus, prior to storing these data in memory, these data are converted to a unified data format.

It is a first objective of the present invention to provide an information storage system that enables faster access to essential data.

It is a second objective of the present inventive to provide an information storage system that permits data that is as up-to-date as possible.

Moreover, there is a need in the market for an information storage system that does not only meet the first mentioned objective but, instead of or in addition to the second objective, also meets a third objective of providing access to data sources that are more of an on-line character and/or comprise huge amounts of data that are difficult to be downloaded, to be converted to a unified data format and to be kept up-to-date in a central place.

SUMMARY OF THE INVENTION

To meet the first and second objectives, the present invention provides an information storage system for providing information to customers, comprising at least one user interface plus memory for storing information, via which user interface data can be read out from the memory, the information storage system being provided with a data entry interface provided with several import interfaces suitable for receiving data, which can have a different data format in each instance, from an associated external data source and for converting them to unified data streams with a unified data format, and storing the unified data streams in the memory, each of the import interfaces being suitable for importing updated data at predetermined times from the associated external data source.

First of all, with such an information storage system, direct access is possible to the essential information, enabling the information requested by a customer to be made known immediately. Information no longer first needs to be fetched from external sources and to undergo conversion operations.

Secondly, by importing updated data at predetermined times, it can be assured that the information is as up-to-date as possible. Such predetermined times can be geared to the speed at which the data in the databanks are updated in order to perfect the updating scheme.

In an embodiment, the predetermined times are such that at any one time only one of the import interfaces can import updated data from the associated external data source.

In one embodiment, the at least one user interface includes an operator processor, plus entry devices, allowing an operator to fetch information in the memory devices in response to a query from a customer, and also a monitor for displaying the fetched information. With such a system, the operator is able directly to help a customer if, for example, the customer uses his (mobile) telephone to phone for information.

In a further preferred embodiment, the information storage system has stored in its memory devices personalized information about the users. Through the use of personalized information, personal assistants are able to answer personal questions more directly and this increases the quality of the service provided.

To meet the first and third objectives, the invention provides an information storage system for providing information to customers, comprising at least one user interface plus memory for storing information, via which user interface data can be read out from the memory, the information storage system being provided with a data entry interface suitable for receiving data, which can have a different data format in each instance, from an associated external data source and for converting them to unified data streams with a unified data format, and storing the unified data streams in the memory, the information storage system being additionally provided with an online services interface for establishing a communications line between the operator processor and online telecommunications services.

With such a system, it is not only possible to have fast access to the centrally stored data but also services that rather than being information-oriented are of a more online nature can be consulted and data sources that have huge amounts of data can be easily consulted.

The invention also provides a method for providing information to customers by means of an information storage system, such information storage system comprising: at least one user interface plus memory for storing information, via which user interface data can be read out from the memory, the method including the steps of receiving data, which may have a different data format in each instance, from an associated external data source, converting the data to unified data streams with a unified data format, and storing the unified data streams in the memory and importing updated data at predetermined times from the associated external data source.

Moreover, the invention provides a method for providing information to customers by means of an information storage system, such information storage system comprising: at least one user interface plus memory for storing information, via which user interface data can be read out from the memory, the method includes the steps of receiving data, which may have a different data format in each instance, from an associated external data source, converting the data to unified data streams with a unified data format, and storing the unified data streams in the memory, and establishing a communications line between the operator processor and online telecommunications services for receiving online data.

DESCRIPTION OF EMBODIMENTS

Figure 1:
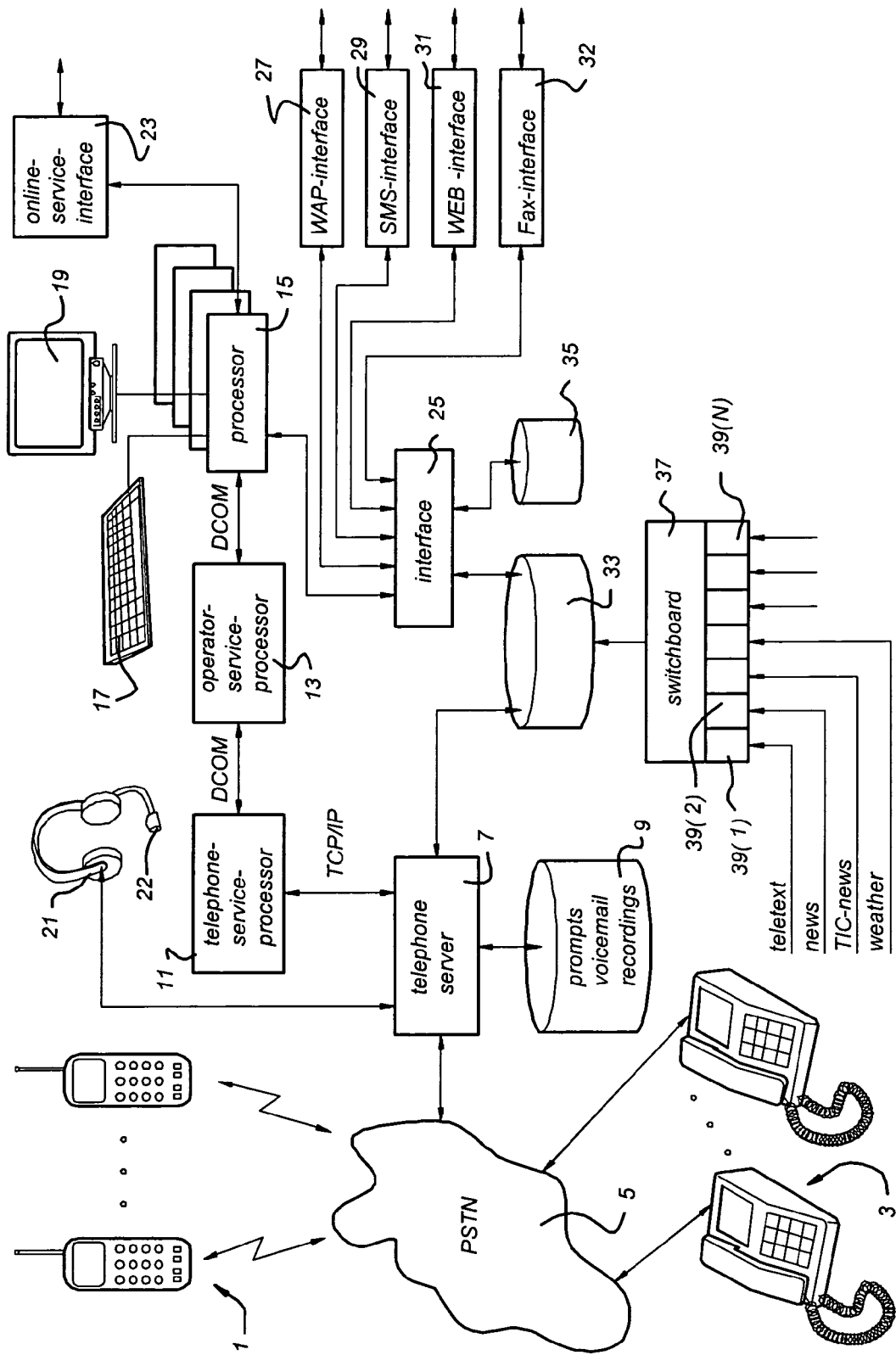
FIG. 1 depicts the functional elements of the inventive information retrieval system.

The invention will be explained with the help of a FIG. 1 that shows the functional elements of an information storage system according to the invention. The figure is not intended to limit the idea of the invention, but merely to illustrate it. Experts may design other set-ups that remain within the framework of the invention. It has been assumed in the figure that users gain access to the data in the central database via a human operator. However, the invention is also usable without the intervention of a human operator. Instead, use may be made of, for example, a voice response (IVR) mechanism. In other words, the "assistant" can also be a personal digital assistant (PDA) In the most general form, therefore, the claims will refer to a "user interface" that gives customers access to stored data.

The figure shows some mobile telephones (1) and also some fixed telephones (3). These telephones are intended to illustrate this circumstance that users are able to communicate with the rest of the system by means of telecommunications devices. However, the invention is not confined to conventional telephones of this kind. Users would also be able to communicate with the rest of the system using other telecommunications devices, such as personal computers equipped with a headset and a microphone.

The mobile telephones (1) and the fixed telephones (3) are able to communicate with a network (5). The network (5) is, for example, a public switched telephone network, PSTN, but any other network known to experts is usable instead of or in addition to the PSTN.

Via the network (5), the mobile telephones (1) and the fixed telephones (3) can communicate with a telephony server (7). The telephony server (7) is connected to a memory (9) in which prompts are stored, for example, and in which voicemail messages and other recordings may also be stored.

The telephony server (7) is connected to a telephone service processor (11), which in turn is connected to an operator service processor (13). The operator service processor (13) is connected to various processors (15). A processor (15) is provided for each personal assistant. Each of these processors (15) is equipped with suitable entry devices (17), enabling the personal assistant to communicate with his/her processor (15). The figure shows that such entry devices comprise a keyboard (17). However, as will be clear to experts, other entry devices may also be provided, such as a mouse, trackball and so on.

Moreover, each of the processors (15) is connected to display devices, for example in the form of a monitor (19), enabling the processor (15) to display information to the personal assistant. Furthermore, each of the processors (15) can be connected to audio playing devices, such as loudspeakers, enabling messages also to be communicated to the personal assistant in the form of sound. Such loudspeakers are not shown in the figure. Each of the personal assistants can use a headset (21) and a microphone (22) connected to the telephony server (7) to communicate with a calling user via the telephony server (7).

Each of the processors (15) is preferably connected to an online services interface (23).

Each of the processors (15) is connected to a central database (33) via an interface (25).

The interface (25) is also connected to a WAP interface (27), an SMS interface (29), a Web interface (31) and a fax interface (32).

The figure shows diagrammatically that the online services interface (23), the WAP interface (27), the SMS interface (29), the Web interface (31) and the fax interface (32) have a communication line with systems outside the system. As experts will know, such communication lines can again run via the network (5).

The interface (25) is also connected to a personal database (35).

The central database (33) additionally has a connection to the telephony server (7).

In order to fill the central database (33) with information from external sources, the central database (33) is connected to a switchboard (37). The switchboard (37) is connected via individual interfaces 39(1), 39(2) . . . , 39(n), (n=2, 3, 4, . . . ) each suitable for receiving data from a predetermined external source. The external sources may include, for example, Teletext, news, traffic information (TIC=Traffic Information Center), weather forecasts and so on.

Generally speaking, the purpose of the separate components shown in the figure is as described below.

The telephony server (7) controls other physical telephony hardware. The telephony hardware may include, for example, one or more Dialogic ISDN cards for a total of 30 or 60 lines. VoiceBocx activeX controls, for example, can be used to control these cards.

The telephone service processor (11) provides all logic necessary to handle inbound calls from users and other telephony-related matters. The actual, physical control of the telephony hardware has been delegated to the telephony server (7). The telephone service processor (11) keeps a record of the status of all inbound calls. Every call is presented by a "session". Additionally, the telephone service processor (11) manages the different queues that may exist for inbound calls. The operator service processor (13) is interrogated in order to assign an assistant to a telephone session from ne of the queues of this kind. The interface between the telephone service processor (11) and the telephony server (7) is, for example, based on TCP/IP (=Transmission Control Protocol/Internet Protocol).

The operator service processor (13) communicates with the telephone service processor (11) via DCOM (=Distributed Component Object Model). The operator service processor (13) additionally communicates with each of the processors (15) by means of DCOM. The operator service processor (13) is the central control point for each of the processors (15). The operator service processor (13) is responsible for managing the status of the various assistants, keeping a record of which operators are logged on to the system and whether they are available. The operator service processor (13) additionally determines the operator to which an inbound call will be allocated. All telephony-related requests, for example to transfer a caller to a third party, are made known to the telephone service processor (11). The telephone service processor (11) then ensures the correct communication with the telephony server (7), which in turn can set up the actual connection with the third party.

The central database (33) is used to store information from external sources via the switchboard (37). Such a local central database (33) enables fast access to the data for the assistants and ensures that the data are always available. For some services, like a diary service, the central database can also be filled with information that the assistant supplies to the central database (33) via the processors (15). An SQL Server (SQL=Standard Query Language) will preferably be used as a platform for the central database (33) (such an SQL server is not shown in Figure).

The personal database (35) is used to store user profiles. These user profiles will preferably be compiled for all subscribers who wish to use the service. The user profiles are in part general to every user, such as name/address and telephone number on which the user is reachable. For another part the user profiles will be specific to the service concerned, such as a list of personal routes for a traffic service (traffic congestion information). For the personal database, too, use will preferably be made of an SQL server as a platform (not shown in the figure).

Even though the central database (33) and personal database (35) are shown as separate components, they can, as will be clear to experts, consist of a single physical common memory.

The switchboard (37) is a processor that can be implemented in any way known to experts. The switchboard (37) comprises a computer program that fetches, preferably periodically, the data from the external sources. The switchboard (37) is equipped with various interfaces 39 (n), (n=1, ... N). Each of these interfaces 39(n) receives a data stream from one external source and converts the received data to a unified data format, after which the switchboard (37) can store the unified data in the central database (33). The unified data format can make use, for example, of raw data files. These are "flat" ASCII files, for example arranged into various predefined fields, separated by a fixed predefined character, such as a tab. The data in a number of data streams must be read in continuously. For these services, it is possible to use separate import routines that do not need to form part of the switchboard (37). Examples of such import routines concern, for example, news that it is updated all the time and traffic information.

There are also services that rather than being information-oriented are of a more online nature. The online services interface (23) exists for these services. This interface preferably uses DCOM. The online service interface (23) can be directly activated by each of the operators via all processors (15). Examples of online services include fax, SMS, e-mail sending services and the e-mail reading service.

Yet other services may be information-oriented, but have a database that is difficult to copy on account of the huge size or the high frequency of updating. An example is an electronic telephone directory. Therefore, such a service will also be interrogated via the online services interface (23).

Users can directly access the information stored in the central database (33) and the personal database (35) as desired via the WAP interface (27), SMS interface (29), Web interface (31) or the fax interface (32). The WAP interface (27) will provide access via WAP, the SMS interface (29) by means of SMS messages, the Web interface (31) by means of the Internet and the fax interface (32) by means of fax messages. Other similar types of interfaces may obviously be added in the future. Instead of WAP (Wireless Application Protocol), other Internet protocols for mobile communications, like I-mode, may be provided.

A large part of the interaction between the users and the system shown in the figure takes place via one of the assistants. In actual fact, each user operates the system via one of the assistants, while the assistant provides in part the presentation of the results. The result will in part also be communicable automatically to the user, for example by means of played information and system prompts, which have been stored in the memory (9).

The primary user interface between the users and the system is that of the (mobile) telephone. The vast majority of both the input and output of results occurs by means of voice communication via the telephone. An extra interface may be provided because users use DTMF (Dual Tone Multiple Frequency) functionality by means of the keys of their (mobile) telephone.

Means may have been provided to allow a user to supplement or change his personal settings in the personal database (35) via one on more of the interfaces (27), (29), (31), (32).

If a user accesses the central database (33) by such means as the Web interface (31), the results will also be made known to the user by means of the Web interface (31). The same applies to the WAP interface (27), the SMS interface (29) and the fax interface (32), i.e. information fetched via those interfaces will produce results via the associated protocols that will be sent back to the user concerned via the same protocols via the same interfaces.

The system is also usable by non-subscribers. The subscriber may, for example, have asked the assistant to answer all telephone calls intended for him/her and to forward them to another telephone line. Non-subscribers who in this situation phone the subscriber will be connected to the assistant who will set up the required connection.

A further description is given below of the services supportable by the system shown in the figure.

Telephoning

The "Telephoning" service is intended primarily to transfer a customer to any desired telephone number. For fast transfer to frequently requested telephone numbers, a personal address book will be kept in this service. The personal address book is stored in the personal database (35). If an assistant is unable to find a telephone number for a user in the personal database (35), there is naturally always the possibility to look up the requested information via the online services interface (23) in an electronic telephone book. Once the assistant has found the information concerned, he/she can inform the user by telephone.

This service can be viewed as an integration of services such as voice dialling, easy connect and national/international directory inquiries. The service supports functionalities that include:
1. say a number and connect: "Connect me to 06-5123456";
2. say a name and connect: "Call Hans", "Call Willem on his mobile";
3. look up a number in the 8008 service of the electronic telephone directory and possibly connect: "I want to speak to Pieter Pot in Rotterdam."

Unified messaging

The purpose of the unified messaging service is to send messages via various media, such as e-mail, SMS and fax. This service is usable on a stand-alone basis or as a help service if the results of an information service must be sent.

It is possible, for example, for an assistant to relay to the user dictated messages, which have been stored in the memory (9), or stored voicemail messages, fax messages, e-mail messages or SMS messages. The e-mail, fax and SMS services have a virtually identical user interface in respect of operation and appearance and are generally referred to collectively as "unified messaging".

Reachability

A user can organize his reachability, so that people who call him on his telephone number are, for example:
a. connected to an assistant who can take messages and store them in the memory (9);
b. directed to his voice mail;
c. forwarded to a different telephone number.

Unified Inbox

The "Unified inbox" service allows the user to view or listen to messages addressed to him. These messages are stored in the memory (9). The messages may be recorded messages (voicemails), e-mail messages or messages stored by the assistant in the memory (9).

Each message may have, for example, a title. The user can then select by title and thereafter retrieve details of the message. The service supports functionalities that include:
a. reading of all titles of all messages;
b. viewing messages, i.e. e-mail and other messages taken by the assistant;
c. listening to, for example, voicemail messages;
d. answering messages via, for example, e-mail;
e. phoning back third parties;
f. forwarding messages, such as e-mail, or messages taken by the operator;
g. sending automatically a voicemail notification, for example via e-mail or SMS.

Diary

The "Diary" service provides a possibility to change and to present in a visual diary appointments that users have stored in the personal database (35) via the operators. Every customer has his own diary. Registered appointments can be sent via any desired interface (27), (29), (31), (32). The operator can also consult the diary.

The Diary service allows the user to consult or modify his/her personal diary from any place where he/she goes or is. An assistant can also consult or change appointments.

The user interface supports functionalities that include:
a. add appointment;
b. modify or delete an appointment;
c. search for an appointment;
d. send an overview of appointments.

Traffic

The "Traffic" service provides up-to-date information about traffic jams on certain roads or in certain regions. The user interface supports functions that include:
a. search by roads, for example: "Are their traffic jams on the A13?";
b. search by road sections, for example: "A13 between Delft South and Terbregseplein?";
c. search by routes, for example: "Are there traffic jams between Eindhoven and Amsterdam?"; d. use favorites, for example: "Are there traffic jams on the way to my office?". Use can be made for this purpose of personal information recorded in the personal database (35) . The operator can see in that database, for example, that a certain user who is phoning him is interested only in traffic jams between Eindhoven and Amsterdam, eliminating the need repeatedly to ask the same question.

News

The purpose of the "News" service is to provide access to news items that originate from one or more news services.

Use can be made, for example, of three entries: via a search term, via categories or via the radio news. In the first of these cases, a search will be made in a news items table stored in the central database (33) for message threads that contain a certain search term. In the second case, a search will be made in a news items table for message threads from a certain category. In the third case, an audio file that contains the most recent radio news will be played. Such an audio file will also be stored in the central database (33).

Again this functionality is combinable with personal settings. A setting can be made for some customers, for example, indicating that they wish to hear news messages only from the last 24 hours, or from the last five days.

The items received from the news services will preferably be stored in the form of such message threads. Each thread consists of one or more items with the same title. Such items will thus concern the same subject but have a different content. Such threads arise if supplementary information is given about a certain subject. The thread to which each item belongs will be stored in the central database (33). This makes it possible to examine which items form a complete thread. The results of a search instruction can, for example, be sorted as default to order of decreasing topicality.

Stock Market

The "Stock Market" service can provide users with data concerning current share prices. The data may originate, for example, from Teletext. Within the service, it is possible to search for stock funds and to store favorite listed securities. This latter item means that a link can again be established with the personal settings of users, as stored in the personal database (35). The favorite listed securities of each user can be stored there, making it is easier for an assistant to ascertain the share prices in which the user is interested, if he wants information about them.

Teletext

The "Teletext" service allows direct browsing in a table containing Teletext data. Each Teletext page has its own page number and can be arranged in a category with various sub-categories. An assistant can, for example, retrieve a Teletext page information:
a. select a favorite;
b. browse in categories and sub-categories;
c. enter a page number directly;
d. search by keyword.

Settings

A number of personal settings are stored for each user in the personal database (35). These settings concern, for example, the services package of the customer who phones in at a certain time. These may be general settings like personal details, name/address or a personal dial-in number on the one hand, and the personalization of different services on the other.

The user is able to set and modify the settings via one of the interfaces (27), (29), (31), (32). Alternatively, the user can obviously also ask one of the assistants to change or to add settings via one of the processors (15).

Personal Number

Each user may have been assigned a personal number. If the user concerned dials in on the personal number, an associated screen will immediately be made visible to the assistant concerned. Via that screen, the assistant can then execute, for example, the following four options: view the diary of the user associated with the personal number, take a message, send a message to the voicemail of the user concerned and forward to a device of a third party.

8008

The "8008" service is arranged in such a way as to be able to search for telephone numbers. A search can be made, for example, according to the following criteria: city/town, name, street, house number and/or postcode. Also, a selection can be made according to a fixed telephone set, mobile telephone, fax and service numbers. Telephone numbers are sought via the online services interface (23) that can search for information in an electronic telephone directory.

The functionality of the switchboard (37) will now be discussed.

Switchboard

The switchboard (37) contains a number of different import routines that are responsible for importing information from different external sources and for storing the information in the central database (33). The switchboard (37) is preferably continuously active and arranged to start up the various import routines at predetermined times.

The switchboard (37) has, for example, a direct connection to the following external sources: Teletext, news, TIC news (Traffic Information Center), weather, stock market, radio news, test TV, flight information and exchange rates.

Each of the import routines preferably follows a certain pattern. The import of data from the various external sources takes place entirely automatically. Each import routine writes a result file to the central database (33) and stores in the central database (33) any exceptions that occurred during the updating of the data.

It is possible to set in the software of the switchboard (37) the period of time after which an updating session must be started. The switchboard (37) uses the result file to check after every updating session whether the updating was carried out properly. If something went wrong, an error message can be sent to a computer of an operator (not shown) of the switchboard (37). Any updating sessions can also take place during the night and at the weekend.

The switchboard (37) can keep a record of how many updating sessions have already taken place and how large the percentage of successful updating sessions was.

The switchboard (37) is preferably equipped with a time routine that enables a check to be made, for example every second, on whether one of the files associated with one of the external sources and stored in the central database (33) requires an updating session. This is done, for example, by converting the current time to minutes and seconds after the last midnight and then checking whether the resulting number of minutes is a multiple of an updating interval of one of the external sources concerned. If this is the case, there is an examination of whether the number of seconds (between 0 and 60) corresponds with a value predetermined for the external source concerned. This latter action occurs in order to prevent the switchboard (37) beginning, at exactly the same moment, updating sessions for various external sources, as a result of which the system could be overloaded.

Each external source has its own implemented interface (39(n)), each of which supports its own import routine in such a way that the data that comes from the various external sources, each with a different format of its own, is stored in one and the same format in the central database (33). All data that come from external sources are, for example, stored in a format accessible to Windows applications. If radio news must be stored, it can for example first be converted to Windows PCM format (PCM=Pulse Code Modulation), 11.025 Hertz, 8 bits. The prompts stored in the memory (9) preferably also have this format. The audio files stored in the central database (33) can then be stored in the memory (9), by means of the connection present between the telephony server (7) and the central database (33), so that they can later be played directly to a user by means of the telephony server (7).

Providing a separate interface (39(n)) for each external source has the advantage that it is simple to maintain the import routine necessary for each external source and that the import of new data from most external sources can continue if one interface (39(n)) is not working. Moreover, it is simple to create connections to new external sources by adding new interfaces (39(n)).

The invention is described above based on a specific embodiment that is shown in the figure. Reference was made at various place to concrete implementation possibilities. Other types of implementation of, for example, the used telecommunications protocols, operating software, etc, are possible within the framework of the invention. It should be clear that the shown figure concerns mainly a small-scale embodiment. In the case of a large-scale embodiment, for example at maximum scale in the Netherlands, changes might possibly have to be made to the structure of the system. It will then be necessary to provide various telephony servers (7) and also various telephone service processors (11) and operator service processors (13). It is also conceivable that several systems of the kind shown in the figure will run in parallel in order to meet the requirements of a larger scale.

The invention claimed is:

1. Information storage system for providing information to customers, the system comprising:
   a central database for storing information;
   at least one user interface via which information can be read out from the central database;
   a data entry interface having a plurality of import interfaces suitable for receiving information, each of said import interfaces receiving information from an associated one of a plurality of external data sources and in a different data format, converting the information so received from all of said plurality of data sources to corresponding unified data streams having a unified data format, and storing the unified data streams in the central database; and
   wherein each one of the import interfaces periodically imports updated information from one of the external data sources associated with said one import interface.

2. Information storage system according to claim 1 wherein the user interface comprises an operator processor and entry devices, through which an operator can retrieve information stored in the central database in response to a query from a customer, and a monitor to display retrieved information.

3. Information storage system according to claim 1 wherein the unified data format uses ASCII files.

4. Information storage system according to claim 3, wherein the ASCII files contain predefined fields that are separated by tab characters.

5. Information storage system according to claim 1 wherein each of said import interfaces is suitable for receiving information from an associated and predetermined one of the external data sources.

6. Information storage system according to claim 1 wherein the information storage system further comprises a personal database that contains personalized information about customers.

7. Information storage system according to claim 6, wherein the system is capable of automatically recognizing an identity of a telecommunications station of a given customer and, upon recognition, reading out the personalized information of said given customer from the personal database.

8. Information storage system according to claim 1 further comprising a further interface situated between the central database and the user interface, to which one of the following interfaces is connected: a WAP interface, an SMS interface, a Web interface and a fax interface, via which access can also be obtained to the central database.

9. Information storage system according to claim 1 further comprising a telephony server, which is provided with a telephony server memory, wherein audio data received from one of the external sources are stored in the telephony server memory.

10. Information storage system according to claim 1 wherein the information is periodically updated from all of said external data sources in such a manner that at any one time only one of the import interfaces can import updated information from the external data sources.

11. Information storage system for providing information to customers, the system comprising:
   a central database for storing information;
   an operator processor through which an operator can retrieve information stored in the central database;
   at least one user interface via which information can be read out from the central database;
   a data entry interface suitable for receiving information, which can have a different data format in each instance, from associated ones of a plurality of external data sources, converting the information so received from all of said external data sources to unified data streams having a unified data format, and storing the unified data streams in the central database; and
   an online services interface for establishing a communications line between the operator processor and online telecommunications services.

12. Method for providing information to customers through an information storage system, wherein the information storage system comprises a central database for storing information and at least one user interface, via which information can be read out from the central database, the method comprising the steps of:
   receiving information, which may have a different data format in each instance and through a plurality of import interfaces, from associated ones of a plurality of external data sources;
   converting the information so received from all of said external data sources to unified data streams with a unified data format;
   storing the unified data streams in the central database;
   periodically importing updated information from the associated external data source.

13. Method according to claim 12 wherein the user interface comprises an operator processor, and the method further comprises retrieving the stored unified data streams via the operator processor in response to a query from a customer.

14. Method according to claim 12 wherein the information storage system further comprises a personal database, and the method further comprises the steps of: automatically recognizing an identity of a telecommunications station of a customer; and upon recognition, reading out personalized information of that customer from the personal database.

15. Method according to claim 12 wherein the method further comprises a step of recording a number of times up dated information is successfully imported.

16. Method according to claim 12 wherein the method further comprises a step of checking, through a time routine, a need for the importing of updated data.

17. Method according to claim 12 wherein the information is periodically updated in such a manner that at any one time only one of the import interfaces can import updated information from an associated one of the external data sources.

18. Method for providing information to customers through an information storage system, wherein the information storage system comprises a central database for storing information, an operator processor through which an operator can retrieve information stored in the central database, and at least one user interface via which information can be read out from the central database, the method comprising the steps of:
   receiving information, which may have a different data format in each instance, from associated ones of a plurality of external data sources;
   converting the information so received from all of said external data sources to unified data streams with a unified data format;
   storing the unified data streams in the central database; and
   establishing a communications line between the operator processor and online telecommunications services for receiving online information.

19. Method for providing information to customers through an information storage system, the information storage system having a central database for storing information and at least one user interface having an operator processor, via which information can be read out from the central database, the method comprising the steps of:
   receiving information, which may have a different data format in each instance, from associated ones of a plurality of external data sources;
   converting the information so received from all of said external data sources to unified data streams with a unified data format;
   storing the unified data streams in the central database; and
   establishing a communications line between the operator processor and online telecommunications services for receiving online information.

20. Method according to claim 19 wherein the method further comprises the step of obtaining a query from a customer by an operator via said operator processor and said communications line.

21. Method according to claim 19 wherein said online telecommunications services comprises fax, SMS, email sending service or email reading service.

* * * * *